Dec. 4, 1923.
M. H. BALLARD
CLUTCH
Filed Jan. 19, 1920
1,475,926
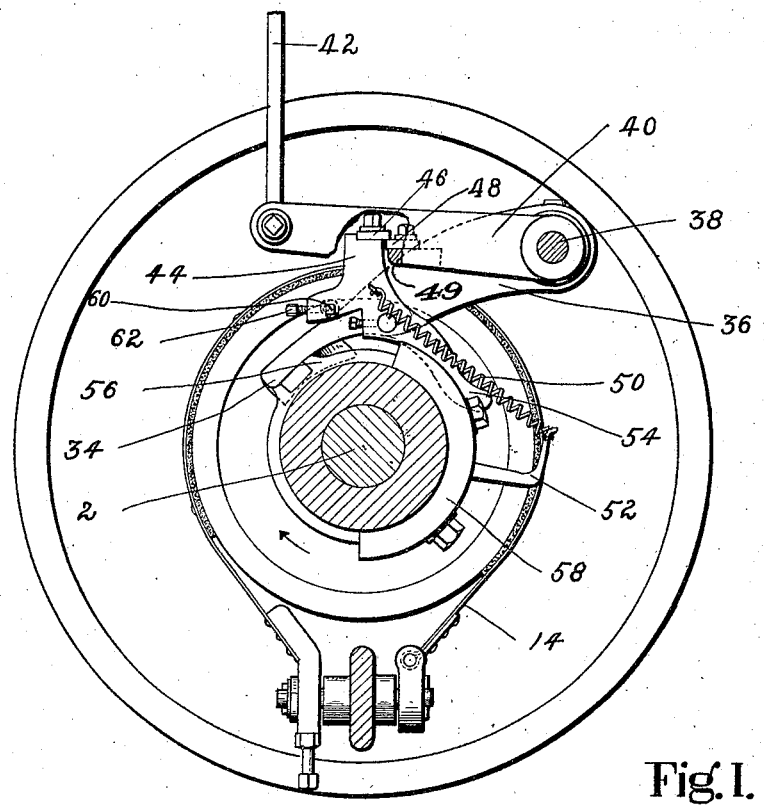
Fig. 1.
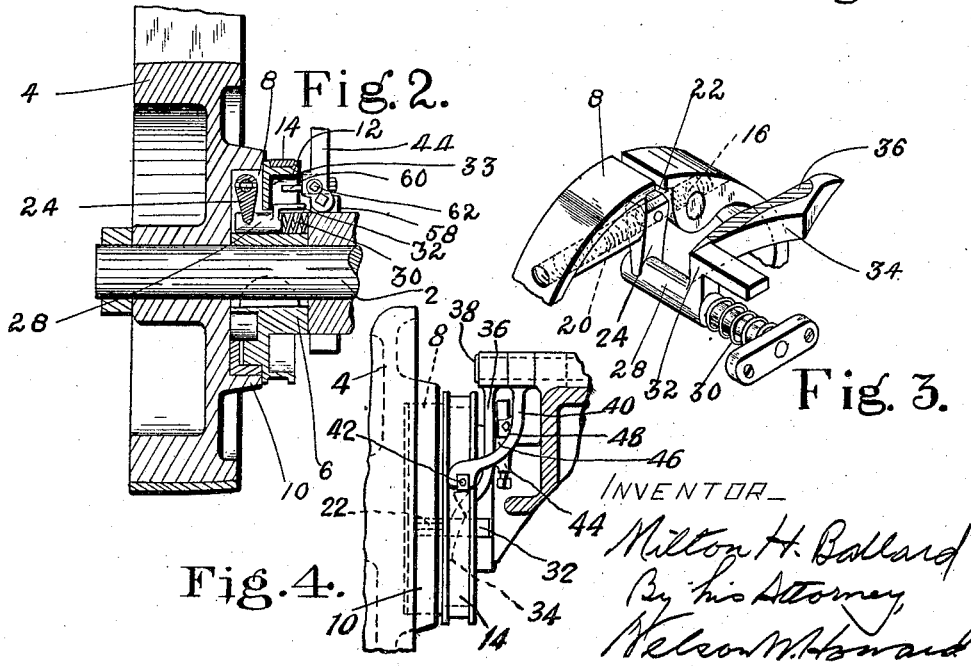
Fig. 2.
Fig. 3.
Fig. 4.
INVENTOR
Milton H. Ballard
By his Attorney
Nelson N. Howard Patented Dec. 4, 1923.

1,475,926

UNITED STATES PATENT OFFICE.

MILTON H. BALLARD, OF LYNN, MASSACHUSETTS, ASSIGNOR TO UNITED SHOE MACHINERY CORPORATION, OF PATERSON, NEW JERSEY, A CORPORATION OF NEW JERSEY.

CLUTCH.

Application filed January 19, 1920. Serial No. 352,518.

*To all whom it may concern:*

Be it known that I, MILTON H. BALLARD, a citizen of the United States, residing at Lynn, in the county of Essex and State of Massachusetts, have invented certain Improvements in Clutches, of which the following description, in connection with the accompanying drawings, is a specification, like reference characters on the drawings indicating like parts in the several figures.

This invention relates to clutches and more particularly to clutches of the non-repeating type.

For convenience in illustration the invention will be shown embodied in the type of clutch disclosed in U. S. Letters Patent No. 1,011,903, granted on an application of Arthur Bates, December 19, 1911, although it will, of course, be understood that the invention is not limited to clutches of this character.

In several well-known clutch constructions, including that disclosed in said Letters Patent, an element is slidably mounted to be moved by spring means in a direction to cause engagement of the clutch members, the construction and arrangement being ordinarily such that said element is positively actuated in the opposite direction to cause the release or disengagement of the clutch members. Commonly a wedge or other cam member is utilized to retract the said clutch controlling element or slide. In the clutch shown in the patent to Bates, the cam or wedge member is actuated upwardly, to permit of the operation of the clutch controlling element or slide, by means comprising a latch which is later released so that the cam may drop into position to retract the clutch controlling element at the end of a definite number of revolutions of the clutch members.

Under certain conditions, due to carelessness in operating or adjusting machines with which this type of clutch is used, the starting lever thereof may be moved through a considerable distance in actuating the clutch mechanism to start the machine. It sometimes happens therefore that sufficient momentum develops to break some part of the starting means or of the clutch mechanism when the movement of the parts is terminated suddenly by some portions of the clutch mechanism coming into contact with each other and acting as a stop device. In the construction shown in the said Letters Patent, movement of the starting lever is terminated under the described conditions by the tail of the latch member contacting with the inner side of one of the clutch members, with the result that the starting lever is liable to be broken.

It is an object of the invention to provide an improved clutch which will be simple in construction, especially effective in operation as a non-repeating clutch, and proof against damage by the careless or inefficient operative.

To this end, as shown, the cam or wedge member which operates to retract the clutch controlling element or slide is arranged to be actuated upwardly, to permit the slide to operate, by means comprising a latch which is released through means which becomes operative upon upward movement of the latch, to permit the cam to drop back to operative position. In the illustrative construction, the means for releasing the latch comprises a stud or pin on the latch itself, which, coming into contact with a relatively fixed surface, turns the latch on its pivot point and causes its release. Since the latch is released by turning on its pivot when the pin comes against a relatively fixed surface it is clear that all danger of breakage of the parts due to the conditions above described is removed.

It is a further object of the invention to provide for returning the described cam or wedge member to operative position early in the revolution of the clutch members by means which is normally operable for that purpose in association with positively operated means for ensuring the release of the cam so that it may drop to operative position should the first mentioned means for any reason fail to operate. With the cam in operative position the clutch members will be disengaged at a predetermined point in the revolution of the shaft.

The invention further resides in means for releasing the clutch controlling cam or wedge member through the proper manual control of the starting means for the machine in combination with subsequently operable means for automatically releasing said cam or wedge member in case it has not been released by the first-mentioned means, thus ensuring that the clutch will be thrown out of operation at a predetermined time in the rotation of the clutch members.

These and other features of the invention, including certain details of construction and combinations of parts, will be set forth in the specification and pointed out in the claims.

In the drawings:—

Figure 1 is an end view of the clutch, the shaft to which the normally stationary clutch member is attached and a portion of said member being shown in section;

Fig. 2 is a vertical longitudinal section through said clutch;

Fig. 3 is a detail perspective of the mechanism through which the diameter of the split ring is varied; and Fig. 4 is a plan view of the clutch with parts broken away.

Loosely mounted upon the shaft 2 to which motion is to be imparted is a pulley 4 connected to any suitable source of power. Rigidly attached to the shaft 2 is the stationary clutch member 6 which carries a split ring or expanding ring 8, a flange 10 upon the pulley 4 surrounding this ring. The clutch member 6 has formed upon it a flange 12 which provides a braking surface for the application of a band brake 14 of any suitable or usual construction. The ring 8 is split, as shown, at its upper part and is normally contracted in diameter and circumference, so that it does not contact with the inner surface of the surrounding flange 10 upon the pulley 4. The ring is also preferably constructed of such material that when expanded so that it contacts with the inner surface of the flange 10 and again released it will quickly return under its own elasticity to its normal non-contacting relation to said flange.

The means for expanding the ring 8, or spreading its two parts, so that it will come into frictional engagement with the inner surface of the flange 10 comprises preferably a screw-threaded member 16 which extends across the split in the ring and pivotally engages a bearing in the other part of said ring, said bearing being formed in one end of a bearing block 20 threaded into said part of the ring 8 and lying normally in axial alinement with the member 16.

The two parts of the ring 8 are cut away in the region of the split to form a recess 22 into which extends a depending arm 24 rigidly attached to the member 16. Turning of the screw 16 to bring about an expansion or contraction of the ring 8 is effected through the arm 24, and in the illustrated construction the means for transmitting motion to the arm 24 comprises a pin or plunger 28 slidably mounted in the stationary clutch member 6 and pressed by a spring 30 normally in a direction to cause the arm 24 and screw 16 to expand the ring 8. The plunger 28 has formed upon it a projection 32 which lies upon the opposite side of the portion of the member 6 upon which the flange 12 is formed with respect to the arm 24, the spring 30 tending normally to press the projection 32 into engagement with the face 33 of the said portion of the clutch member 6. When the parts are in the position shown in Fig. 2, the ring 8 is expanded into frictional engagement with the flange 10 and the parts are clutched together so that rotating movement is imparted to the shaft 2 through the pulley 4. Unclutching of the parts is effected in the illustrated construction through a cam or wedge 34 formed upon the offset end of a lever 36 pivoted at 38 upon a stationary part of the machine with which the clutch is associated. The wedge or cam 34 is arranged, when in its lowermost position, to enter between the face 33 of the clutch member 6 and the projection 32 upon the plunger 28 and as the plunger 28 rotates with the clutch member 6 to cause it to be moved by the component of force parallel to the axis of rotation against its spring 30, thereby turning the member 16 through the arm 24 and permitting the spring 8 to contract under its own elasticity. Engagement of the wedge 34 with the projection 32 to bring about a movement of the plunger 28 longitudinally of the axis of rotation is illustrated especially in Fig. 3 of the drawings. It will be understood that the end of the lever 36 is offset laterally of its body portion so that the wedge 34 is disposed within the flange 12, the construction and arrangement being such that the end of the wedge lies against the vertical wall 33 of the clutch member 6. The wedge 34 is preferably normally in the position shown in Fig. 3 in which position the parts of the clutch are held out of clutching relation to each other. When it is desired to bring about a clutching of the parts to effect a rotation of the shaft 2 through the pulley 4, the wedge 34 is lifted out of operative relation to the projection 32, and in the illustrated construction the means for lifting the wedge 34 comprises a lever 40, also pivoted at 38 on the frame of the machine with which the clutch is associated, said lever 40 being connected by a rod 42 to means under the control of the operator by which it may be lifted and being normally locked to the wedge carrying lever 36 by a latch comprising a latch member 44 pivoted upon the lever 36 and carrying the catch plate 46 which projects normally over a similar catch plate 48 upon the lever 40. The latch member 44 is yieldingly pressed toward the catch plate 48 by a spring 50 connected at one end to said member above its pivot on the lever 36 and at its other end to a hook 52 upon the frame of the machine with which the clutch is associated. The latch member 44 is extended upon the other side of its pivot from the catch plate 46 to form a tail 54 arranged to be engaged by a projection 56 upon the clutch member 6 when it begins to rotate after the parts have been clutched together, the illustrated projection being formed upon one wall of the guide for the pin or plunger 28. The engagement of the projection 56 with the tail 54 of the latch member 44 operates to move the catch plate 46 out of its latching position above the catch plate 48, thus leaving the wedge carrying lever free to drop under the action of gravity and under the pull of the spring 50. Dropping of the lever 36 brings the wedge 34 into position to engage the projection 32 upon the plunger 28 when the clutched parts have rotated so that the projection 32 is brought into operative relation to the wedge 34. The plunger 28 will thus be moved against the tension of its spring 30 and the parts will be unclutched at the end of a single rotation. When the lever 40 drops after release of the starting lever (not shown) of the machine, a cam surface 49 on the lever 40, the said surface being continuous with the adjacent surface on the plate 48, operates to push the latch 44 to the left in Fig. 1, until the plate 48 drops below the catch plate 46. The last-mentioned plate is instantly re-engaged above plate 48 through the action of the spring 50, which returns the latch 44 to the right in Fig. 1.

Means is provided for tripping the latch member 44 immediately after the wedge or cam 34 has been lifted out of contact with the member 32 by connections between the wedge and the starting lever of the machine. In other words, the latch member 44 is operated to disengage the catch plates 46 and 48 from each other very shortly after the clutch members have engaged and, in the illustrative construction, this tripping of the latch member 44 is caused by a member 60 in the form of a pin or stud projecting from the latch member 44 in position to engage the inner surface of the flange 12 of the fixed clutch member 6. Preferably, and as shown, the member 60 is detachably secured to the latch member 44 by means of a screw threaded pin 62. Normally the member 60 will be operated by continued movement of the starting lever to trip or release the latch member 44 immediately after the release of the sliding plunger 28 and prior to the time of engagement of the cam projection 56 with the tail portion 54 of the latch member 44. As heretofore stated, the rod 42 is connected with means under the control of the operator (the starting lever of the machine) by which it may be lifted to cause the tripping of the clutch. It is conceivable that the connecting rod 42 might be moved just far enough to cause the release of the plunger 28 and the setting of the clutch and not far enough to bring the tripping member 60 into contact with the flange 12 so that the latch member 44 would not be turned on its pivoted point and become disengaged from the member 40. Hence the cam projection 56 above described is retained for the purpose of ensuring the disengagement of the latch member 44 by striking against the tail portion 54 thereof and thus releasing the cam or wedge member 34 in time to prevent a second revolution of the shaft. Under the conditions described as having existed in prior constructions, breakage of the parts, either of the tail of the catch member 44 or of the handle portion of the starting means, not infrequently occurred when the tail portion acted as a stop to limit the movement of the manually operable starting means for the machine. In the illustrative construction the arrangement is clearly such that the trip member 60 will engage with the flange 12 and cause the tripping of the latch member 44 before the tail portion 54 of the same latch member can contact with the flange 12. Hence in tripping the machine through the manually operable means provided for that purpose, there is no possibility of the downward movement of said means being terminated by contact of the tail portion 54 of the latch member 44 with a portion of one of the clutch members. The construction shown not only insures against breakage of the parts through careless or unusually forcible operation of the starting lever, but provides an arrangement of clutch parts that is especially effective to secure a single revolution of the shaft upon one actuation of the starting means of the machine.

In the event that the plunger 28 should not be pressed by its spring 30 sufficiently far when released to cause an effective clutching of the two clutch members a cam plate 58 has been provided upon the frame of the machine which serves to force the plunger 28 to its inner limit of movement provided it has been moved initially by the spring 30 far enough to cause such a clutching of the two clutch members that they begin to rotate together. This prevents slipping of the clutch parts over each other after the mechanism clutched to the constantly moving pulley 4 has begun to perform its work and therefore offers resistance to the driving action of said pulley.

Having thus described the invention, what is claimed as new and desired to be secured by Letters Patent of the United States is:—

1. In apparatus of the class described, the combination with co-operating clutch members, of means for operating the clutch constituted by said members comprising a cam controlled member, a cam for operating the member in one direction, means for moving the cam comprising a latch mounted on the cam, and means, comprising a pin or stud mounted on the latch and arranged to become operative during movement of the latch for causing unlatching of said latch.

2. In apparatus of the class described, the combination with co-operating clutch members, of means for operating the clutch constituted by said members comprising a cam controlled member, a wedge or cam for operating the member in one direction, and means for lifting the cam to release the member comprising a latch mounted on the cam and arranged to be unlatched during upward movement of the latch to permit the cam to drop to operative position with respect to said member.

3. In apparatus of the class described, the combination with co-operating clutch members, of means for operating the clutch constituted by said members comprising a cam controlled member, a cam for operating said member and movable into and out of operative position, means for moving the cam out of operative position comprising a latch, and means carried by the latch and operable by contact with a portion of one clutch member to unlatch the latch during upward movement thereof, and means operating subsequently to the first mentioned unlatching means for ensuring unlatching of said latch.

4. In apparatus of the class described, the combination with co-operating clutch members, of means for operating the clutch constituted by said members comprising a cam controlled member, a cam for operating said member and movable into and out of operative position, means for moving the cam out of operative position comprising a latch, a projection carried by the latch and operable under manual control of the operative for causing unlatching of the latch, and automatically operable means comprising a cam directly operable on the latch for ensuring the unlatching of said latch should the first-mentioned unlatching means for any reason fail to operate.

5. In apparatus of the class described, the combination with co-operating clutch members, of means for operating the clutch constituted by said members comprising a cam controlled member, a cam for controlling said member and movable into and out of operative position, means for moving the cam out of operative position comprising a pivoted latch, means located on the latch above the point of pivotal turning thereof and arranged to be operated upon upward movement of the latch to cause unlatching of the latch, and means on the latch below the point of pivotal turning thereof and arranged for co-operation with a portion of one of the clutch members for ensuring the unlatching of said latch.

6. In apparatus of the class described, the combination with co-operating clutch members, of means for operating the clutch constituted by said members comprising a cam controlled member, a cam for operating the member in one direction, means for lifting the cam comprising a latch, and means, comprising a pin or stud mounted on the latch, arranged to contact with a portion of one of the clutch members during upward movement of the latch for causing unlatching of said latch.

7. In apparatus of the class described, the combination with co-operating clutch members, of means for operating the clutch constituted by said members comprising a cam controlled member, a wedge or cam for operating the member in one direction, and means for lifting the cam to release the controlled member comprising a latch pivoted to the cam and arranged to be unlatched during upward movement thereof under manual control to permit the cam to drop to operative position with respect to said controlled member.

8. In apparatus of the class described, the combination with co-operating clutch members, of means for operating the clutch constituted by said members comprising a cam controlled member, a cam for operating said member and movable into and out of operative position, means for moving the cam out of operative position comprising a latch, and a projecting portion carried by the latch and operable by contact with a portion of one clutch member to unlatch the latch during upward movement thereof, and a cam operating subsequently to the first mentioned unlatching means for ensuring the unlatching of said latch.

9. In apparatus of the class described, the combination with co-operating clutch members, of means for operating the clutch constituted by said members comprising a cam controlled member, a cam for operating said member and movable into and out of operative position, means for moving the cam out of operative position comprising a latch, a projection carried by the latch and operable upon contact with one of the clutch members to cause the unlatching of the latch, and automatically operable means for ensuring the unlatching of said latch should the first-mentioned unlatching means for any reason fail to operate.

10. In apparatus of the class described, the combination with co-operating clutch members, of means for operating the clutch constituted by said members comprising a cam controlled member, a cam for controlling said member and movable into and out of operative position, means for moving the cam out of operative position comprising a pivoted latch, a projection located on the latch above the point of pivotal turning thereof and arranged to be operated upon upward movement of the latch to cause unlatching of the latch, and a projecting tail portion on the latch below the point of pivotal turning thereof and arranged for co-operation automatically with a portion of one of the clutch members for ensuring the unlatching of said latch.

11. In apparatus of the class described, the combination with co-operating clutch members, of means for operating the clutch constituted by said members comprising two levers turning about a common axis, a pivoted latch member carried by one of said levers and arranged to engage a part of the other of said levers to lock said levers together, means comprising a pin or stud on the latch for causing the unlatching of said latch, and a cam on one of said clutch members for striking against a portion of the latch, other than the pin or stud above mentioned, for ensuring the unlatching of said latch.

12. In apparatus of the class described, the combination with co-operating clutch members, of means for operating the clutch constituted by said members comprising two levers turning about a common axis, a pivoted latch carried by one of said levers and arranged to engage a part of the other of said levers to lock the levers together, said latch having extensions or tail portions extending in opposite directions, a projection on one extension for engaging one of the clutch members upon upward movement of the levers to cause the unlatching of said latch, and a cam for engaging the other extension or tail portion of the latch for ensuring the unlatching thereof.

13. In apparatus of the class described, the combination with co-operating clutch members, of means for operating the clutch constituted by said members comprising two levers, means for connecting said levers together including a latch, one of said levers being constructed and arranged to hold the clutch normally inoperative, means mounted on the latch and arranged to engage a portion of one of the clutch members during the upward movement of the latch to cause unlatching thereof, and means automatically operative for ensuring the unlatching of said latch.

14. In apparatus of the class described, the combination with co-operating clutch members, of means for operating the clutch constituted by said members comprising two levers, a pivoted latch carried by one of said members and arranged to engage a part of the other of said levers to lock said levers together, means carried by the latch and operable by contact with a portion of one clutch member to unlatch the latch during upward movement thereof, and means operating subsequently to the first mentioned unlatching means for ensuring the unlatching of said latch.

15. In apparatus of the class described, the combination with co-operating clutch members, of means for operating the clutch constituted by said members comprising two levers turning about a common axis, means for connecting said levers together including a latch, means for effecting the unlatching of said latch, and means acting subsequently to the first mentioned unlatching means for ensuring the unlatching of said latch.

16. In apparatus of the class described, the combination with co-operating clutch members, of means for operating the clutch constituted by said members, comprising a cam controlled member, a cam for operating said member and movable into and out of operative position, means for moving the cam out of operative position so constructed and arranged as to be releasable from the cam, means under the control of the operative for releasing the cam so that it may return to operative position, and means automatically operable, at a predetermined interval after the operation of the said releasing means, to insure the release of the cam should the first-mentioned releasing means fail to operate.

17. In apparatus of the class described, the combination with co-operating clutch members, of means for operating the clutch constituted by said members comprising a cam controlled member, a cam for operating said member and movable into and out of operative position, means for moving the cam out of operative position so constructed and arranged as to be releasable from the cam, means for releasing the cam so early in the cycle that there is no danger of the cam-releasing parts being broken through acting as a stop device, and positively operated means for insuring the release of the cam should the first-mentioned releasing means for any reason fail to operate.

18. In an apparatus of the class described, the combination with a shaft and co-operating clutch members, one mounted movably and the other fixedly on the shaft, of means for operating the clutch of which said members constitute a part comprising an operating member movable in a direction parallel with the axis of rotation of the clutch members, a cam for moving said operating member in one direction, means comprising a latch for moving the cam to inoperative position, and means comprising a projection on the latch arranged to engage a part of the clutch member fixedly carried by the shaft during the movement of the cam moving means for causing unlatching of said latch.

19. In an apparatus of the class described the combination with a shaft and co-operating clutch members, one mounted movably and the other fixedly on the shaft, of means for operating the clutch of which said members constitute a part comprising an operating member movable in a direction parallel with the axis of rotation of the clutch members, a member for moving the said operating member in one direction, means comprising a latch for moving the last mentioned member to inoperative position, the arrangement being such that upon release of the latch the last mentioned member moves to operative position, means comprising a projection on the latch arranged to become operative during movement of the latch for causing unlatching of said latch, and means positively operated by the shaft to ensure unlatching of the latch.

20. In an apparatus of the class described, a shaft, a power pulley mounted for rotation on the shaft, a clutch ring for connecting the pulley to the shaft so that the shaft will rotate with the pulley, a member slidable along the shaft for expanding and contracting the clutch ring, a cam for operating the sliding member in one direction, means comprising a latch for moving the cam to inoperative position, the construction being such that upon release of the latch the said cam will move to operative position, means comprising a projecting portion on the latch arranged to become operative during movement of the cam moving means for causing unlatching of said latch, and a member fixedly carried by the shaft for operating the latch in case it has not been already moved to unlatching position.

21. In an apparatus of the class described, the combination of co-operating clutch members comprising an expansible and contractible clutch ring, of means for expanding the clutch ring to cause co-operation of the clutch members, said means comprising a member slidable in a direction parallel to the axis of rotation of the clutch members, a cam for moving the slidable member in one direction, a spring for moving it in the other direction, means comprising a latch for moving the cam to inoperative position, the construction and arrangement being such that upon release of the latch the cam will return to operative position, means comprising a projecting portion on the latch arranged to become operative during movement of the cam moving means for causing unlatching of said latch, and a member projecting from the shaft and positively operated thereby for operating on the latch in case it has not already been moved to unlatching position.

22. In apparatus of the class described, the combination with co-operating clutch members, of means for operating the clutch constituted by said members comprising a cam controlled member, a cam for operating said member and movable into and out of operative position, means for moving the cam out of operative position so constructed and arranged as to be releasable from the cam, means for releasing the cam, and positively operated means for insuring the release of the cam should the first-mentioned releasing means for any reason fail to operate.

In testimony whereof I have signed my name to this specification.

MILTON H. BALLARD.